(12) United States Patent
Shen et al.

(10) Patent No.: US 9,997,886 B2
(45) Date of Patent: Jun. 12, 2018

(54) METHOD OF FORMING TERMINATION END ON CABLE

(71) Applicants: Tyco Electronics (Shanghai) Co. Ltd., Shanghai (CN); Tyco Electronics (Dongguan) Ltd., Dongguan (CN); Tyco Electronics Corporation, Berwyn, PA (US); Innogetic Technology Co., Ltd., Guangdong (CN)

(72) Inventors: Hongzhou Shen, Shanghai (CN); Dandan Zhang, Shanghai (CN); Roberto Francisco-Yi Lu, Bellevue, WA (US); George J. Dubniczki, Mechanicsburg, PA (US); Kok Wai Wong, Guangdong (CN)

(73) Assignees: TE Connectivity Corporation, Berwyn, PA (US); Innogetic Technology Co., Ltd., Guangdong (CN); Tyco Electronics (Shanghai) Co. Ltd., Shanghai (CN); Tyco Electronics (Dongguan) Ltd., Dongguan (CN)

( * ) Notice: Subject to any disclaimer, the term of this patent is extended or adjusted under 35 U.S.C. 154(b) by 392 days.

(21) Appl. No.: 14/662,665

(22) Filed: Mar. 19, 2015

(65) Prior Publication Data
US 2015/0325970 A1 Nov. 12, 2015

(30) Foreign Application Priority Data
Mar. 19, 2014 (CN) .................. 2014 1 01027105

(51) Int. Cl.
*H01R 43/28* (2006.01)
*H01R 43/16* (2006.01)
(Continued)

(52) U.S. Cl.
CPC ............. *H01R 43/28* (2013.01); *H01R 43/16* (2013.01); *H01R 9/05* (2013.01); *H02G 1/12* (2013.01);
(Continued)

(58) Field of Classification Search
CPC ... H01R 43/16; H01R 43/28; Y10T 29/49123; Y10T 29/49174; H02G 1/12
See application file for complete search history.

(56) References Cited

U.S. PATENT DOCUMENTS

| 3,153,358 A * | 10/1964 | Havens ................ H02G 1/1256 81/9.51 |
| 4,704,925 A * | 11/1987 | Sutton ...................... H02G 1/12 24/523 |
| 4,763,410 A * | 8/1988 | Schwartzman ...... H02G 1/1212 29/828 |

* cited by examiner

*Primary Examiner* — Peter DungBa Vo
*Assistant Examiner* — Jeffrey Carley
(74) *Attorney, Agent, or Firm* — Barley Snyder

(57) ABSTRACT

A method of forming a terminating end of a cable, comprising the steps of: providing a cable; cutting a circumferential slit through an outer insulation layer; clamping a first section of the outer insulation layer with a first clamping device, and clamping a second section of the outer insulation layer with a second clamping device; displacing the first clamping device, separating the first section from the second section and exposing a section of a metal braid; displacing the first clamping device; pushing and pressing the exposed section to fold the exposed section into a braid protrusion portion; loosening the first and second clamping devices, and removing the cable from the first and second clamping devices; cutting the braid protrusion portion with a cutting device to form a protruding braid portion, the protruding braid portion; and removing the first section of the outer insulation layer and a first protruding braid portion.

14 Claims, 6 Drawing Sheets

(51) Int. Cl.
*H02G 1/12* (2006.01)
*H01R 9/05* (2006.01)
(52) U.S. Cl.
CPC .... *Y10T 29/49123* (2015.01); *Y10T 29/49174* (2015.01)

METHOD OF FORMING TERMINATION END ON CABLE

CROSS-REFERENCE TO RELATED APPLICATION

This application claims priority under 35 U.S.C. § 119 (a)-(d) to Chinese Patent Application No. 201410102710.5, dated Mar. 19, 2014.

FIELD OF THE INVENTION

The present invention relates to a method of forming a termination end on a cable.

BACKGROUND

Conventionally, processing a terminating end of a cable that is to be connected to an electrical connector or a terminating device generally involves several distinct steps. Firstly, a section of an outer insulation layer is stripped off of the terminating end of the cable either manually or with a special cutter, so as to expose a section of metal braid under the outer insulation layer. Then, the exposed section of metal braid is cut to have a predetermined length either manually or with the special cutter. While this process can result in the desired connection, the process is very complicated and time-consuming, the processing accuracy is very low, and if a specialty cutter is required, the cost is expensive.

Therefore, there is a need for a method of processing a terminating end of a cable that is simple, relatively fast, and generally applicable, all while maintaining a high processing accuracy.

SUMMARY

A method of forming a terminating end of a cable, comprising the steps of: providing a cable; cutting a circumferential slit through an outer insulation layer; clamping a first section of the outer insulation layer with a first clamping device, and clamping a second section of the outer insulation layer with a second clamping device; displacing the first clamping device, separating the first section from the second section and exposing a section of a metal braid; displacing the first clamping device; pushing and pressing the exposed section to fold the exposed section into a braid protrusion portion; loosening the first and second clamping devices, and removing the cable from the first and second clamping devices; cutting the braid protrusion portion with a cutting device to form a protruding braid portion, the protruding braid portion; and removing the first section of the outer insulation layer and a first protruding braid portion.

BRIEF DESCRIPTION OF THE DRAWINGS

The invention will be described by way of example, with reference to the accompanying Figures, of which.

DETAILED DESCRIPTION OF THE EMBODIMENT(S)

Figure 1:
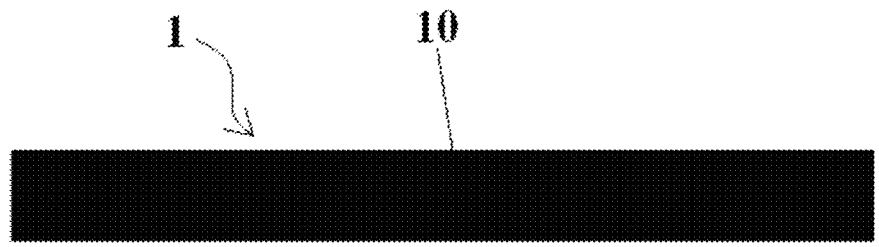
FIG. 1 is a side view of a cable.

Exemplary embodiments will be described hereinafter in detail with reference to the Figures, wherein the like reference numerals refer to the like elements. The disclosure may, however, be embodied in many different forms and should not be construed as being limited to the embodiments set forth herein; rather, these embodiments are provided so that the disclosure will be thorough and complete, and will fully convey the concept of the disclosure to those of ordinary skill in the art.

In the following detailed description, for purposes of explanation, numerous specific details are set forth in order to provide a thorough understanding of the disclosed embodiments. Those of ordinary skill in the art would appreciate, however, that one or more embodiments may be practiced without these specific details. In other instances, well-known structures and devices are schematically shown in order to simplify the drawing.

A method of forming a termination end on a cable will now be described with reference to FIGS. 1-7.

Figure 7:
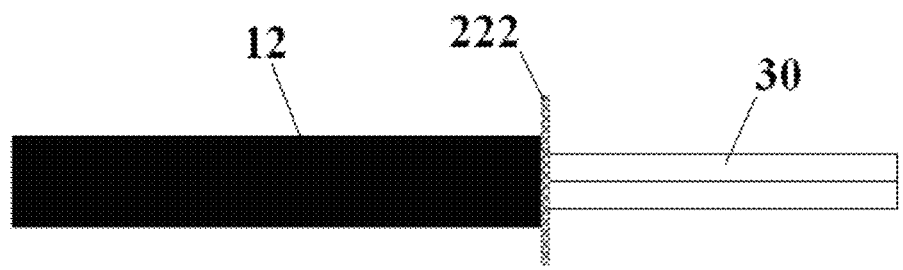
FIG. 7 is a side view of the terminating end after the outer insulation layer has been removed and the protruding braid portion has been separated from the terminating end.

As shown in an embodiment of FIG. 1, a cable 1 is firstly provided. In an embodiment, as shown in FIG. 7, the cable 1 has a core 30, a metal braid 20 wrapped around the core 30, and an outer insulation layer 10 wrapped around the metal braid 20.

In an embodiment, the cable 1 may be a power cable having an electric conductor or a photoelectric composite cable having an optical fiber and an electric conductor. In an embodiment, the cable 1 may be a single-core cable having a single core or a multi-core cable having a plurality of cores.

Figure 2:
FIG. 2 is a side view of a slit cut circumferentially around an outer insulation layer of the cable.

In an embodiment of FIG. 2, a terminating end of the cable 1 is partly cut to form a slit 102 extending circumferentially around the outer insulation layer 10. The outer insulation layer 10 at the terminating end of the cable 1 is divided into a first section 11 and a second section 12. The first section 11 is positioned on a first side (right side in FIG. 2) of the slit 102, and the second section 12 is positioned on a second side (left side in FIG. 2) of the slit 102. In an embodiment, the slit 102 is cut to have a depth equal to or less than a thickness of the outer insulation layer 10.

Figure 3:
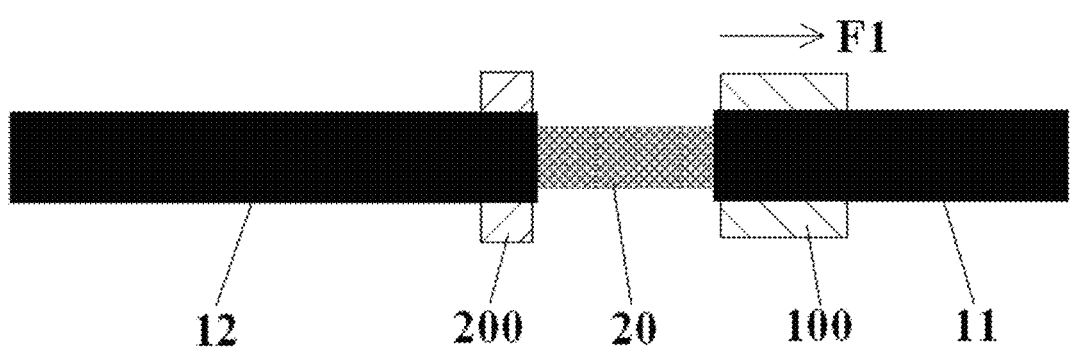
FIG. 3 is a side view of separating the outer insulation layer on a terminating end of the cable from the slit to expose a section of metal braid, using a first clamping device and a second clamping device.

As shown in an embodiment of FIG. 3, a first clamping device 100 is clamped on the first section 11 of the cable 1, and a second clamping device 200 is clamped on the second section 12 of the cable 1.

The first clamping device 100 is displaced in an opposing direction F1 away from the second clamping device 200, so as to separate the first section 11 from the second section 12 by a predetermined distance, exposing a section of metal braid 20.

The first clamping device 100 is configured to be a movable clamping device, and the second clamping device 200 is configured to be a stationary clamping device. In this way, the first section 11 is displaced away from the slit 102 by the first clamping device 100, while the second section 12 is fixed on the cable 1 by the second clamping device 200.

Figure 4A:
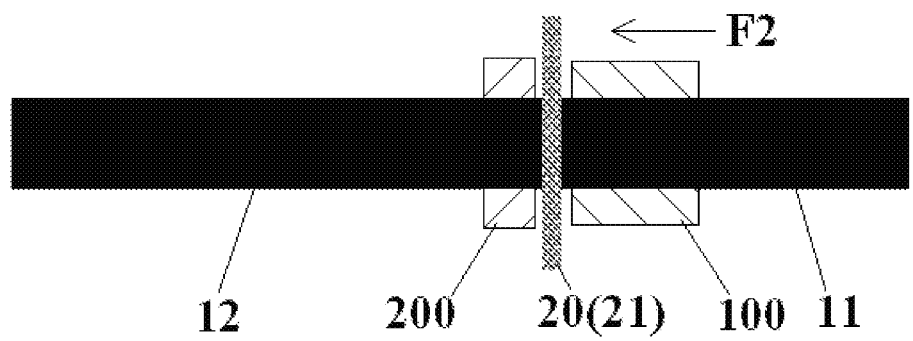
FIG. 4A is a side view of pushing and pressing the exposed section of metal braid of the cable by the first clamping device and the second clamping device.

As shown in an embodiment of FIG. 4A, the first clamping device 100 is then displaced in a retracting direction F2 towards the second clamping device 200, so as to push and press the exposed section of metal braid 20. The exposed section of metal braid 20 is then folded into a disc-shaped braid protrusion portion 21.

Figure 8:
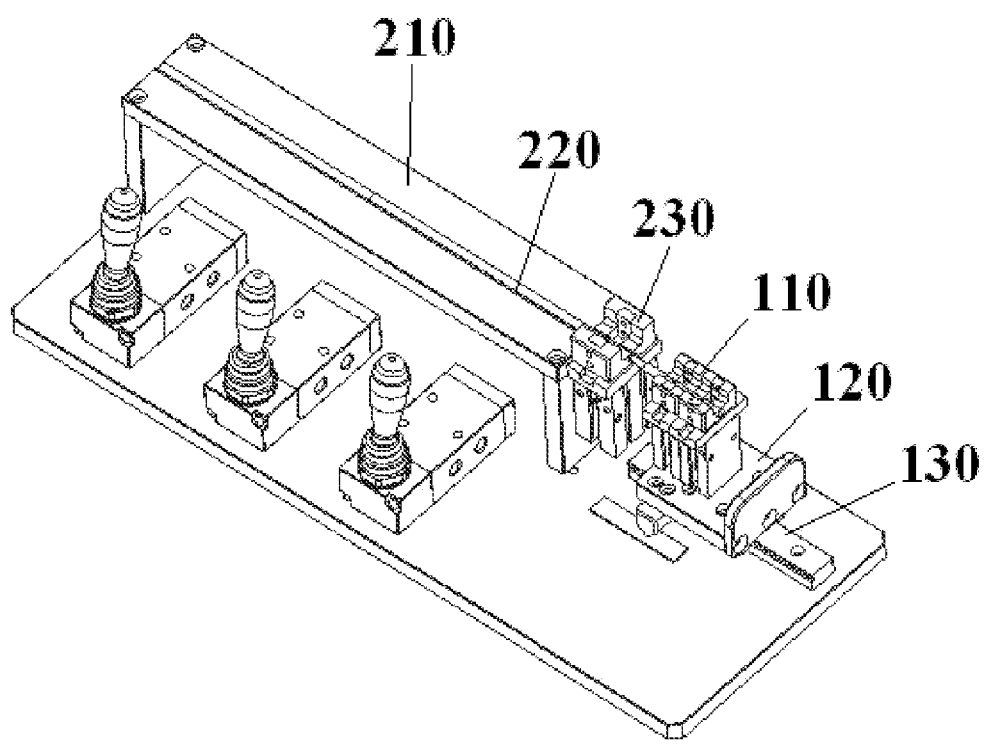
FIG. 8 is a perspective view of the first clamping device and the second clamping device.

As shown in FIG. 8, the first clamping device 100 includes a base (no labeled), a rail 130 mounted on the base, a movable plate 120, and a first clamp 110. The movable plate 120 is slidably mounted on the rail 130. The first clamp 110 is mounted on the movable plate 120 and configured to grasp the first section 11.

The second clamping device 200 includes a positioning plate 210 and a second clamp 230. The positioning plate 210 is formed with a V-shaped positioning groove 220 extending along a length thereof. The cable 1 is placed and held in the V-shaped positioning groove 220. In an embodiment, the positioning plate 210 is immovably fixed to the base. The second clamp 230 is mounted on the positioning plate 210 at an end of the V-shaped positioning groove 220 and configured to grasp the second section 12.

The first clamping device 100 and the second clamping device 200 both are fixed on the same base.

In an embodiment, the first clamping device 100 and the second clamping device 200 are controlled by an automated program to automatically perform various operations.

Figure 4B:
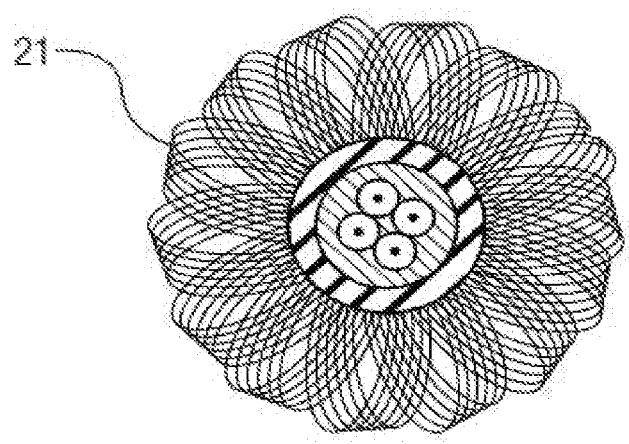
FIG. 4B is a real image of a disc-shaped braid protrusion portion formed on the cable after pushing and pressing the exposed section of metal braid.

After forming the disc-shaped braid protrusion portion 21, as shown in FIGS. 4A and 4B, the first clamping device 100 and the second clamping device 200 are loosened, and the cable 1 is removed from the first clamping device 100 and the second clamping device 200.

Figure 5A:
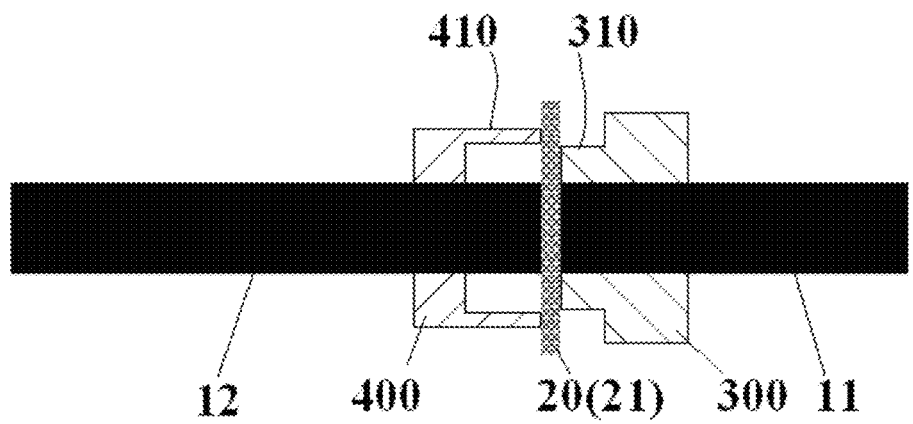
FIG. 5A is a side view of cutting the disc-shaped braid protrusion portion by a cutting device, where the cutting device is in an initial cutting position.
Figure 5B:
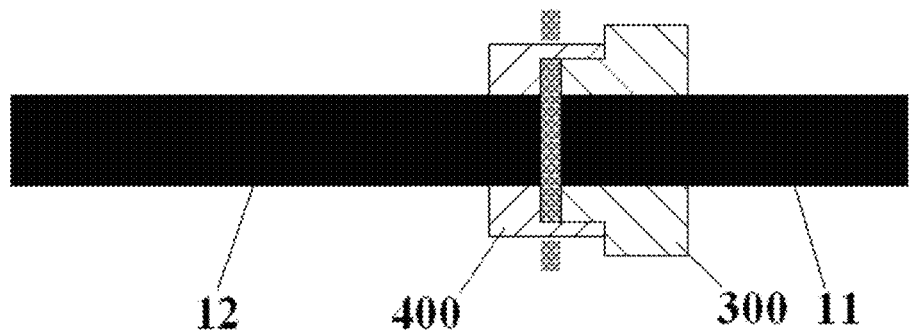
FIG. 5B is a side view of cutting the disc-shaped braid protrusion portion with the cutting device, where the cutting device is in a final cutting position.

In the embodiments of FIGS. 5A and 5B, the cutting device includes a first cutting member 300 and a second cutting member 400. The first cutting member 300 has a cutting projection 310 with a predetermined outer diameter. The second cutting member 400 has a cutting projection receiving recess 410 configured to have an inner diameter corresponding to the outer diameter of the cutting projection 310 and to be matched with the cutting projection 310.

The method of cutting the disc-shaped braid protrusion portion 21 with the first and second cutting devices 300, 400 includes the steps of:

fixing the first cutting member 300 on one of the first section 11 and the second section 12 with an end surface of the cutting projection 310 abutting against a side of the disc-shaped braid protrusion portion 21; and displacing the second cutting member 400 at the opposite second side of the disc-shaped braid protrusion portion 21 to move toward the first cutting member 300. The second cutting member 400 is displaced towards the first cutting member 300 until the cutting projection 310 is receiving in the cutting projection receiving recess 410. The disc-shaped braid protrusion portion 21 is thus cut into the protruding braid portion 22 having the predetermined length by opposite edges of the cutting projection 310 and the cutting projection receiving recess 410.

Figure 5C:
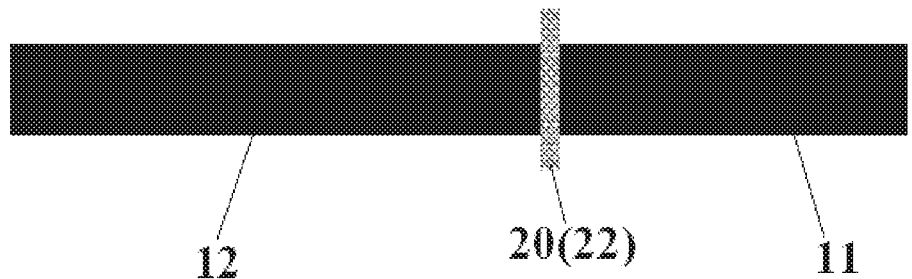
FIG. 5C is a side view of a protruding braid portion having a predetermined length after cutting the disc-shaped braid protrusion portion.
Figure 5D:
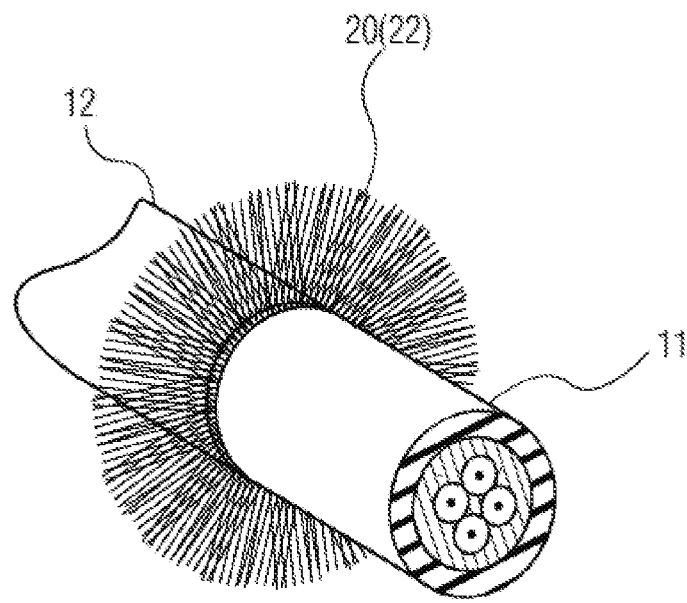
FIG. 5D is a real image of a protruding braid portion having a predetermined length after cutting the disc-shaped braid protrusion portion.

FIG. 5C is an illustrative view of the protruding braid portion 22 having the predetermined length after cutting the disc-shaped braid protrusion portion 21; FIG. 5D is a real image of the protruding braid portion 22 having the predetermined length after cutting the disc-shaped braid protrusion portion 21.

Figure 6:
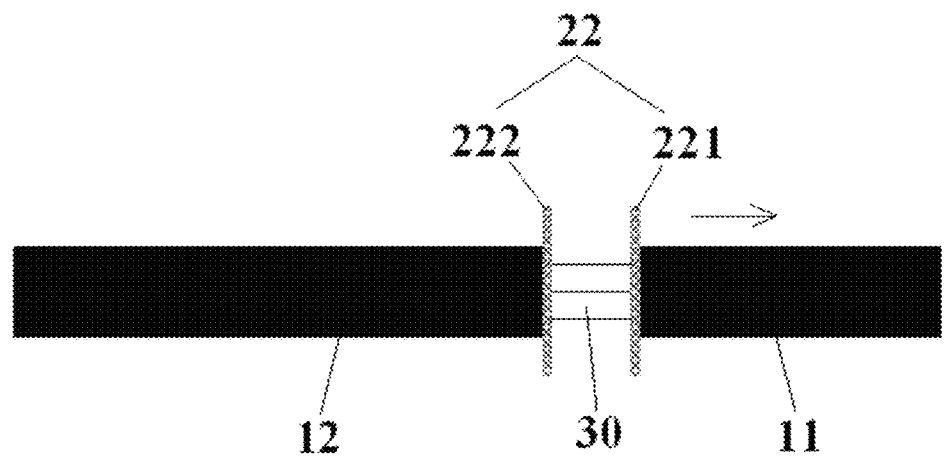
FIG. 6 is a side view of the outer insulation layer being partly removed and the protruding braid portion being separated from the terminating end of the cable.

After cutting the disc-shaped braid protrusion portion 21 with the cutting device, the disc-shaped braid protrusion portion 21 is cut into the protruding braid portions 22 having a first protruding braid portion 221 at the first side of the slit 102 and a second protruding braid portion 222 at the second side of the slit 102, as shown in FIG. 6.

In an embodiment of FIG. 6, after cutting the disc-shaped braid protrusion portion 21 with the first and second cutting devices 300, 400, the first section 11 and the first protruding braid portion 221 at the terminating end of the cable 1, which have been separated from the cable 1, may be easily removed from the terminating end of the cable 1. Thus, a section of the core 30 at the terminating end of the cable 1 is exposed, and the second protruding braid portion 222 having the predetermined length remains on the terminating end of the cable 1.

After performing the above steps shown in the embodiments of FIGS. 1-6, the terminating end of the cable 1 is processed, as shown in FIG. 7, to be adapted for connecting to a connector or a terminating device.

Those of ordinary skill in the art would appreciate that the above embodiments are intended to be illustrated, and not restrictive. For example, many modifications may be made to the above embodiments by those of ordinary skill in the art, and various features described in different embodiments may be freely combined with each other without conflicting in configuration or principle.

Although several exemplary embodiments have been shown and described, it would be appreciated by those of ordinary skill in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" or "an embodiment" of the present invention are not intended to be interpreted as excluding the existence of additional embodiments that also incorporate the recited features. Moreover, unless explicitly stated to the contrary, embodiments "comprising," "including" or "having" an element or a plurality of elements having a particular property may include additional such elements not having that property.

What is claimed is:

1. A method of forming a terminating end of a cable, comprising the steps of:
   providing a cable having
      a core,
      a metal braid wrapped around the core, and
      an outer insulation layer wrapped around the metal braid;

cutting a circumferential slit through the outer insulation layer on a terminating end of the cable;

clamping a first section of the outer insulation layer at a first side of the slit with a first clamping device, and clamping a second section of the outer insulation layer at an opposite second side of the slit with a second clamping device, the first clamping device is a movable clamping device including a rail, a movable plate slidably mounted on the rail, and a first clamp mounted on the movable plate and grasping the first section of the outer insulation layer, the second clamping device is a stationary clamping device including a positioning plate having a V-shaped cable positioning groove extending linearly and being complementary to the cable;

displacing the first clamping device by moving the movable plate along the rail in a separating direction away from the second clamping device, separating the first section from the second section by a predetermined distance and exposing a section of the metal braid;

displacing the first clamping device by moving the movable plate along the rail in an opposite retracting direction toward the second clamping device;

pushing and pressing the exposed section of the metal braid to fold the exposed section into a disc-shaped braid protrusion portion;

loosening the first and second clamping devices, and removing the cable from the first and second clamping devices;

cutting the disc-shaped braid protrusion portion with a cutting device to form a protruding braid portion of a predetermined length, the protruding braid portion having
 a first protruding braid portion on the first side of the slit and
 a second protruding braid portion on the second side of the slit; and removing the first section of the outer insulation layer and the first protruding braid portion from the terminating end of the cable, exposing a section of the core at the terminating end of the cable, with the second protruding braid portion of the predetermined length remains on the terminating end of the cable.

2. The method according to claim 1, wherein the slit has a depth equal to or less than a thickness of the outer insulation layer.

3. The method according to claim 1, wherein the cable is a single-core cable or a multi-core cable.

4. The method according to claim 1, wherein the cable is a power cable having an electrical conductor or a photoelectric composite cable having an optical fiber and an electric conductor.

5. The method according to claim 1, wherein the exposed terminating end of the cable is connected to an electrical connector or a terminating device.

6. The method according to claim 1, wherein the second clamping device includes a second clamp mounted on the positioning plate.

7. The method according to claim 6, wherein the second clamping device grasps the second section of the outer insulation layer.

8. The method according to claim 7, wherein the first clamping device and the second clamping device both are connected to the base.

9. The method according to claim 8, wherein the second clamping device is immovably fixed to the base.

10. The method according to claim 1, wherein the cutting device has a first cutting member with a cutting projection having a predetermined outer diameter.

11. The method according to claim 10, wherein the cutting device has a second cutting member with a cutting projection receiving recess having an inner diameter corresponding to the outside diameter of the cutting projection.

12. The method according to claim 11, wherein the cutting projection is complementary to the cutting projection receiving recess, being insertable therein.

13. The method according to claim 12, further comprising the step of:
 positioning the first cutting device on one of the first section and the second section of the outer insulation layer, with an end surface of the cutting projection abutting against a side of the disc-shaped braid protrusion portion.

14. The method according to claim 13, further comprising the step of:
 displacing the second cutting member at an opposite side of the disc-shaped braid protrusion portion towards the first cutting member until the cutting projection is received in the cutting projection receiving recess, cutting the disc-shaped braid protrusion portion into the protruding braid portion with the predetermined length by opposite edges of the cutting projection and the cutting projection receiving recess.

* * * * *